H. E. ROSE.
WRENCH.
APPLICATION FILED MAR. 17, 1915.
1,152,764.
Patented Sept. 7, 1915.
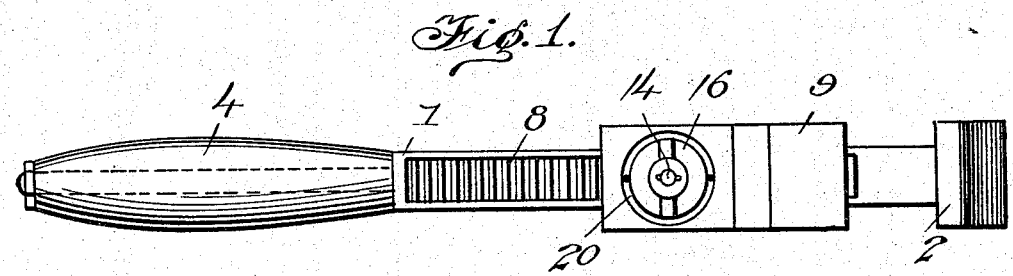
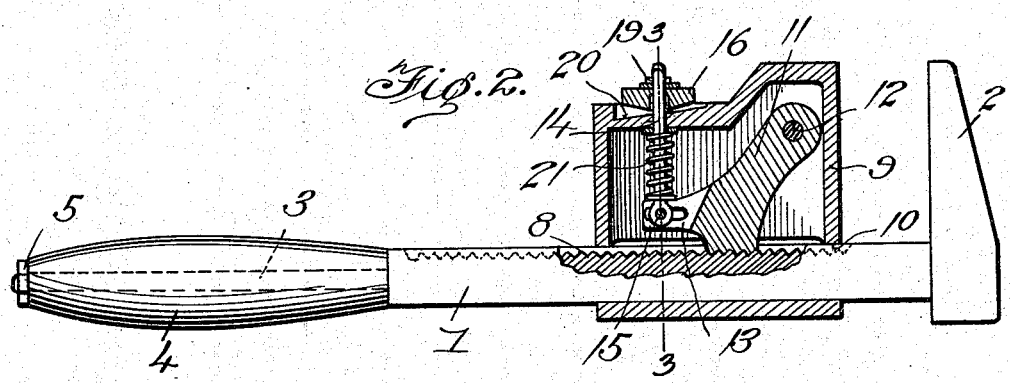
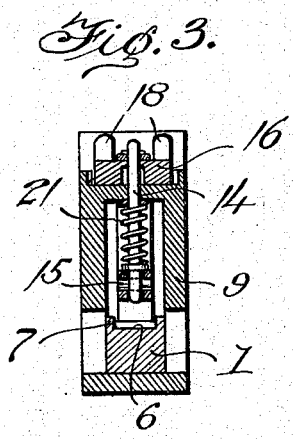
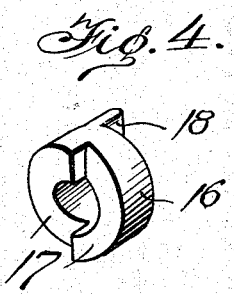
Witnesses
W. H. Mulligan
Carroll Bailey
Inventor
Harry E. Rose
By Richard B. Owen,
Attorney

UNITED STATES PATENT OFFICE.

HARRY E. ROSE, OF GREENFIELD, OKLAHOMA.

WRENCH.

1,152,764. Specification of Letters Patent. Patented Sept. 7, 1915.

Application filed March 17, 1915. Serial No. 15,012.

*To all whom it may concern:*

Be it known that I, HARRY E. ROSE, a citizen of the United States, residing at Greenfield, in the county of Blaine and State of Oklahoma, have invented certain new and useful Improvements in Wrenches, of which the following is a specification.

This invention relates to wrenches, and has for its primary object to provide a shank having a sliding jaw and to provide the sliding jaw with means for locking the same in any desired position on the shank.

Another object is to provide the sliding jaw with a dog which is adapted to engage the teeth on the shank and to provide a novel and efficient means for holding the dog into or out of engagement with the teeth.

With these and other objects in view, the invention consists in the novel features of construction, combination and arrangement of parts, as will be hereinafter more fully described, illustrated in the accompanying drawings and claimed.

In the drawings: Figure 1 is an edge view of the wrench. Fig. 2 is a side elevational view, showing parts in section. Fig. 3 is a transverse section on line 3—3 of Fig. 2. Fig. 4 is a detail perspective view of the cam face actuating member.

Referring to the drawings by numerals, 1 designates the shank which is provided at one end with a fixed jaw 2 and at its opposite end with a reduced extension 3, a handle 4 being slidably connected with the extension 3 and secured thereto by means of a nut 5. One face of the wrench is recessed to provide a channel 6 having side flanges 7 extending on either side thereof. Teeth 8 are formed upon the lower wall of the channel 6 and have their upper edges terminating short of the outer edges of the flanges 7.

A hollow jaw 9 is slidably mounted upon the shank 1 by means of openings 10 formed therein through which the shank extends. A dog 11 is pivoted within the slidable jaw, as at 12 and has teeth on the free end thereof for engagement with the teeth 8 of the shank 1. Slotted lateral extensions 13 are formed upon the dog 11 and are adapted to receive therebetween one end of a rod 14, a pin 15 being passed through the end of the rod and the slotted extensions in order to pivotally connect the rod to the dog. This rod extends through an opening in the jaw, and has loosely mounted upon the outer end thereof a cam actuating member 16.

The cam actuating member 16 comprises a disk having cam surfaces 17 formed upon one face thereof and thumb gripping extensions 18 formed upon the opposite face thereof to provide for actuating the same, a pin 19 being passed through a suitable opening in the rod 14 in order to prevent upward movement of the member 16.

Cam faces 20 are formed in one face of the jaw 9 for engagement by the cam faces of the member 16 so that by turning the member 16 by means of the gripping portions 18, the rod 14 will be moved to move the dog from engagement with the teeth 8. A coil spring 21 is arranged about the rod 14, having one end in engagement with the inner wall of the hollow jaw 9 and the other end in engagement with the extensions 13. Thus it will be understood that the dog 11 will be returned to its normal position in engagement with the teeth 8 after the releasement of the rod 14 caused by the turning of the member 16.

From the foregoing description taken in connection with the accompanying drawings, it is thought that the construction and operation of the device will be clearly understood and while I have herein shown and described one specific form of my invention I do not wish to be limited thereto except for such limitations as the claims may import.

What is claimed is:—

1. A wrench comprising a shank having teeth formed therein, a slidable jaw mounted on said shank, a dog pivoted within said jaw for engagement with said teeth, a rod carried by said dog and projecting exteriorly of the jaw, a member loosely mounted on said rod, cam surfaces formed on said member, cam surfaces formed on said jaw, the cam surfaces of said member adapted to engage the cam surfaces of said jaw, and means to move said dog in locking engagement with said teeth.

2. A wrench comprising a shank having a channel formed in one face thereof, teeth formed in the bottom of said channel, the sides of said channel forming upstanding flanges, said flanges projecting above the upper face of said teeth, a slidable jaw mounted on said shank, a dog pivoted within said jaw for engagement with said teeth, said jaw engaging the upper edges of said flanges, the rod carried by said dog projecting exteriorly of said jaw, a member loosely mounted on said rod, cam faces formed on said member, cam surfaces formed on said jaw, the cam surfaces of said member adapted to engage the cam surfaces of said jaw, and means to move said dog into locking engagement with said teeth.

In testimony whereof I affix my signature in presence of two witnesses.

HARRY E. ROSE.

Witnesses:
ROY F. BROWER,
FRANK A. DILL.

Copies of this patent may be obtained for five cents each, by addressing the "Commissioner of Patents, Washington, D. C."